(No Model.)
O. KROMER & F. RINKLEFF.
HARVESTER.
No. 249,774. Patented Nov. 22, 1881.
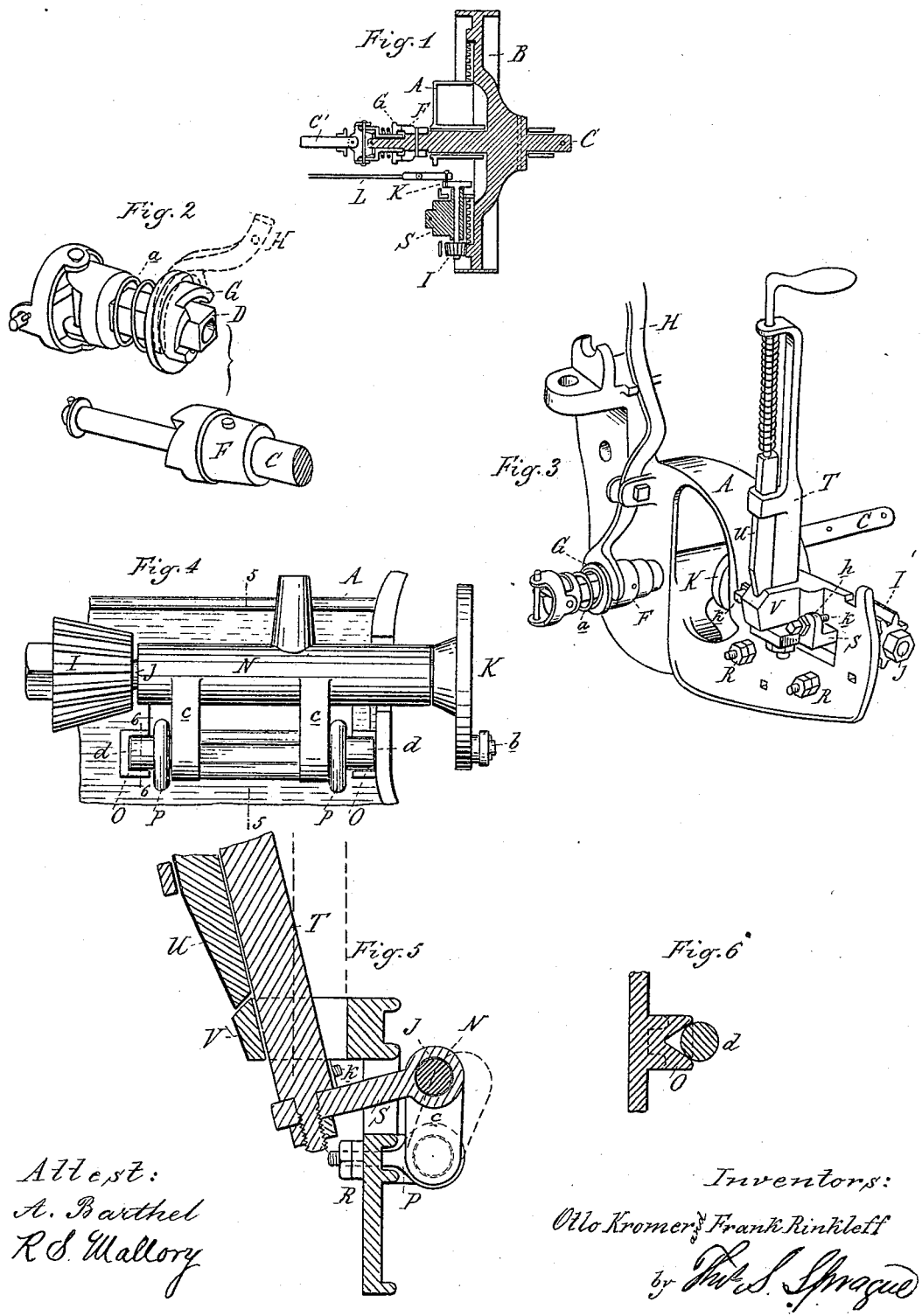
Attest:
A. Barthel
R. S. Mallory
Inventors:
Otto Kromer & Frank Rinkleff
by Thos. S. Sprague
Atty

UNITED STATES PATENT OFFICE.

OTTO KROMER AND FRANK RINKLEFF, OF SANDUSKY, OHIO.

HARVESTER.

SPECIFICATION forming part of Letters Patent No. 249,774, dated November 22, 1881.

Application filed July 8, 1881. (No model.)

*To all whom it may concern:*

Be it known that we, OTTO KROMER and FRANK RINKLEFF, of Sandusky, in the county of Erie and State of Ohio, have invented an Improvement in Harvesters, of which the following is a specification.

The nature of our invention relates to new and useful improvements in harvesters, and is designed as an improvement upon the harvester as patented to us March 2, 1880; and our invention consists, first, in the construction and arrangement of an improved clutch, by which motion is communicated through the tumbling-rod to the rake; second, in an improved pinion-shifter, which allows of easy adjustment of the pinion to the main gear, and wherein all lost motion is instantly and automatically taken up by a spring-wedge, as more fully hereinafter described.

Figure 1 is a sectional plan of part of a harvester provided with our improvements. Fig. 2 is an enlarged perspective of our improved clutch detached. Fig. 3 is a detached perspective of the main frame, carrying our improved pinion-shifter. Fig. 4 is a side elevation of our pinion-shifter. Fig. 5 is a cross-section of the same on the line 5 5 in Fig. 4. Fig. 6 is a section on line 6 6 in Fig. 4.

In the accompanying drawings, which form a part of this specification, A represents the main frame of a harvester constructed and mounted substantially as described in our hereinbefore-mentioned Letters Patent.

B is the main driving-wheel, rigidly secured on the shaft or axle C, which imparts motion to the rake-head through the tumbling-rod C'.

F is one member of a clutch, which is rigidly secured upon the shaft C, and G is the other or movable member of the clutch, sleeved upon the square sleeve D, the two parts being kept in engagement by my means of a spring, *a*.

H is a clutch-lever, fulcrumed to the main frame as shown, the lower end of said lever embracing the movable member G, while the upper end is extended upward to within easy reach of the driver's seat.

By this construction and arrangement of parts the throwing into or out of gear of the rake is brought within perfect control of the driver, as by moving the lever so as to disengage the members of the clutch, the shaft C will revolve within the sleeve D without imparting any motion to such sleeve or the parts which are operated by it. Upon releasing said lever the spring *d* causes the clutch to engage, when the rake will be operated as before, such engagement and disengagement being effected without compelling the driver to leave his seat or stop the machine.

A pinion, I, engaging with the teeth of the main driving-wheel, is secured to one end of a short shaft, J, to the opposite end of which is secured a crank-disk, K, which, by a wrist-pin, *b*, is pivotally attached to the pitman L, by means of which a reciprocal motion is communicated to the knife-bar. This shaft J is properly journaled in a box, N, which is provided with lugs or ears *c*, by means of which said box is pivotally secured or hinged to the main frame A, as is clearly shown in Figs. 4 and 5. In the drawings herewith submitted we show the lugs *c* as provided with trunnions *d*, which rest in V-shaped bearings formed in the outer ends of lugs O, which project from the face of the main frame; and P are eyebolts, which embrace the trunnions *d*, pass through the frame A, and receive upon their opposite ends nuts R, by means of which the trunnions are held to the bearings, and whereby any lost motion of the trunnions may be taken up. From one side of the box N projects an arm, S, which passes through a slot in the frame, and to its free end is secured a lever, T. This lever extends upward through a slotted extension or arm, V, of the frame A, and to this lever T is properly secured a spring wedge-bar, *u*, the upper end of which terminates in a handle within easy reach of the driver when in his seat.

The arm S of the box N is provided with one or more lugs, *h*, which carry the set-screws *k*, the inner ends of which impinge against the side of the frame A when the pinion is in engagement, as shown in Fig. 3. In this figure the shaft T, which carries the pinion, is shown in dotted lines in its position when the pinion is in engagement with the main driving-wheel, and as the shaft J overhangs its bearings, the tendency of the pinion is to draw more into engagement with the main driving-wheel, the degree of said engagement being regulated by the set-screws *k*, which, by impinging against the main frame, prevents the pinion following the tendency to draw nearer into engagement with the main drive-wheel, while all the lost motion will be instantly and automatically taken up by the spring-wedge $u$ entering the slotted arm V and holding the parts firmly locked in position. To shift the pinion the spring-wedge $u$ is lifted out of the slotted arm V and moved into the position shown in Fig. 5, where the spring will hold it against displacement. It will be noticed that during the shifting of the pinion the pitman is never brought out of the plane of its motion, thereby avoiding all springing of the same. The V-shaped bearings of the trunnions facilitate the taking up the lost motion by simply tightening up the nuts R from time to time, while they also prevent end motion.

What we claim as our invention is—

1. In a harvester, the combination, with the main frame A, drive-wheel B, pinion I, and shaft J, of the adjustable box N, pivotally secured to the frame A at two points and adapted to swing bodily to and from said frame, for the purpose of engaging or disengaging the pinion I with the main driving-wheel, substantially as specified.

2. The box N, carrying the shaft J and pinion I, and pivoted to the main frame, as described, in combination with the spring locking-wedge $u$, whereby the lost motion of the pinion is automatically taken up by said spring-wedge, substantially as specified.

3. The box N, carrying the shaft J, pinion I, and crank-disk K, and pivoted to the main frame at two points, as described, in combination with the main frame, the slotted arm V of said frame, the arm S, the lever T, and the spring locking-wedge $u$, substantially as and for the purpose specified.

4. A pinion-shifter for a harvester, operating and constructed substantially as described, in combination with set-screws $k$, which, by their impingement against the main frame, regulate the degree of engagement between the pinion and driving-wheel, substantially as set forth.

5. The box N, carrying the shaft J, and provided with lugs $c$ and trunnions $d$, in combination with the lugs O, provided with V-shaped recesses, the eyebolts P, arm S, lever T, and the spring locking-wedge $u$, substantially as and for the purpose specified.

OTTO KROMER.
FRANK RINKLEFF.

Witnesses:
H. S. SPRAGUE,
WILLIAM KOCH,
WILLIAM B. H. HUNT.